ered to.

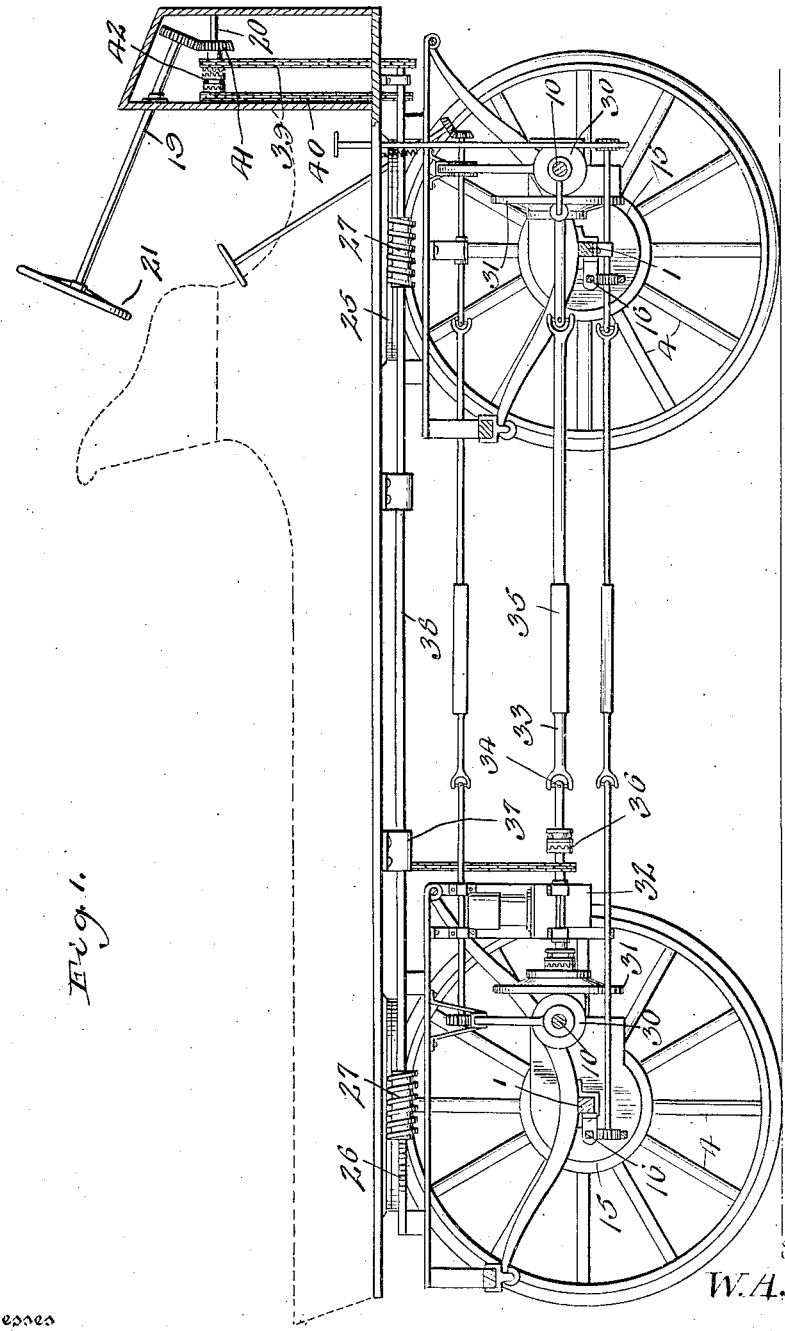

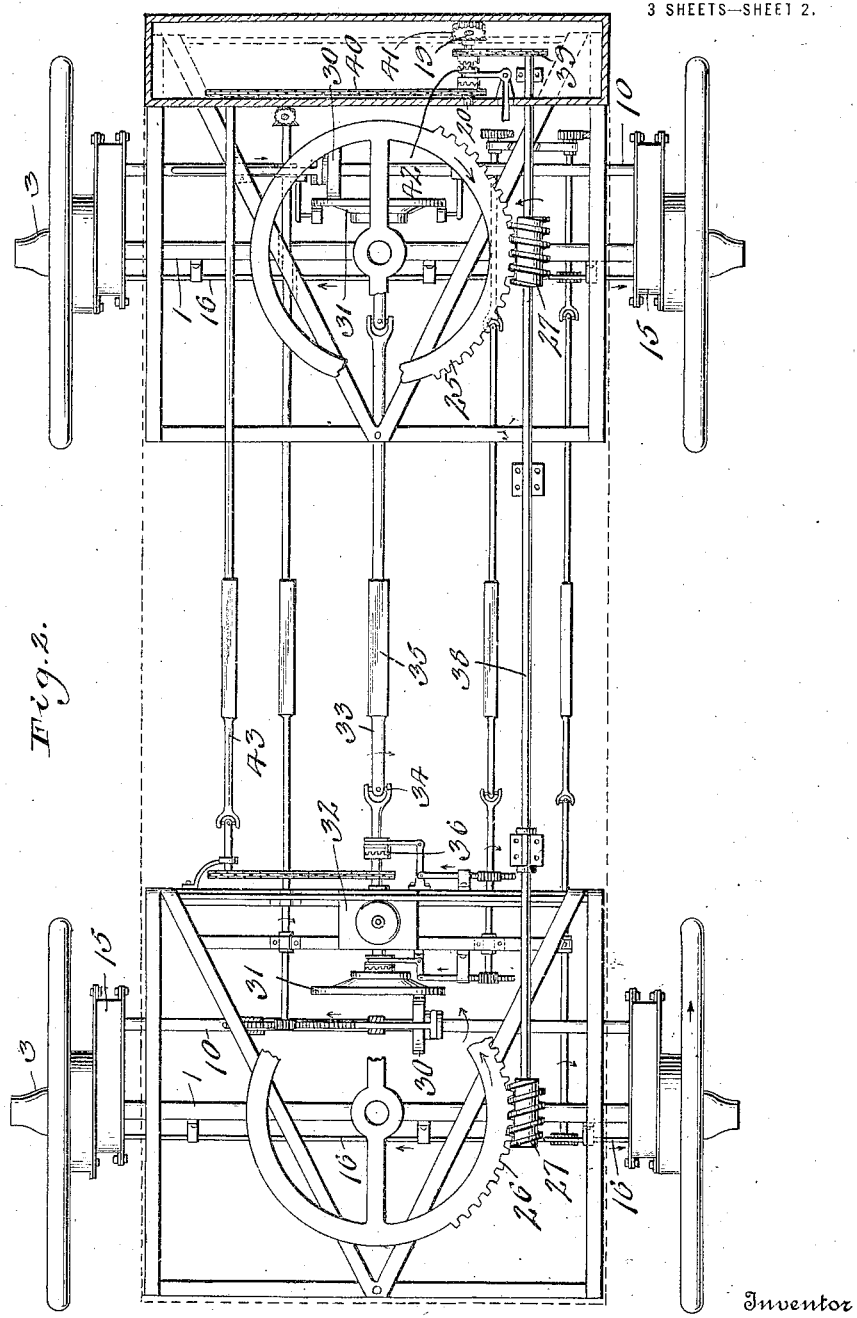

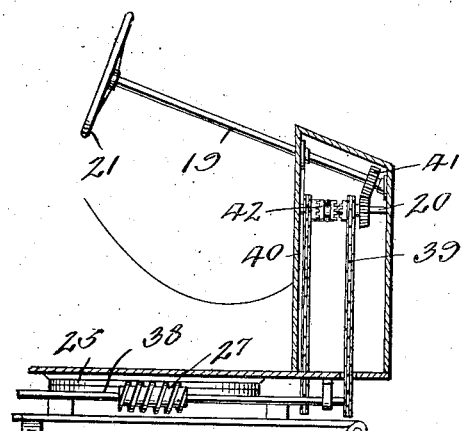
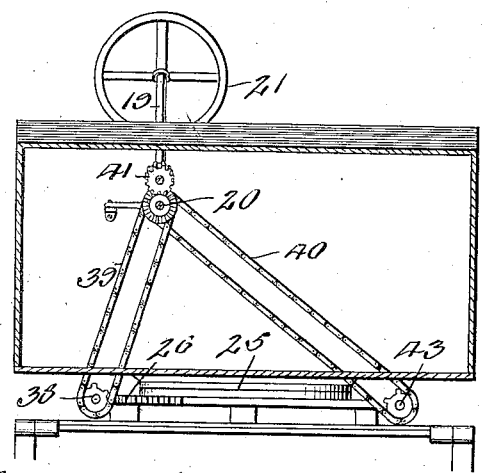
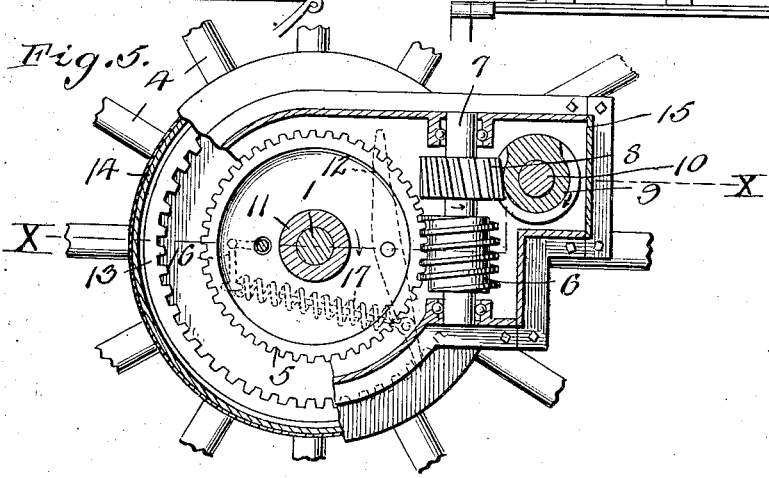
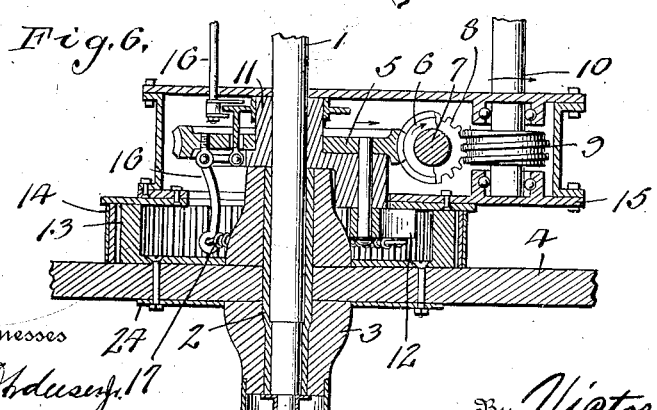

UNITED STATES PATENT OFFICE.

WALLACE A. LEE, OF OAKLAND, CALIFORNIA.

MOTOR-VEHICLE.

1,155,250.  Specification of Letters Patent.  Patented Sept. 28, 1915.

Application filed March 21, 1914. Serial No. 826,388.

*To all whom it may concern:*

Be it known that I, WALLACE A. LEE, a citizen of the United States, residing at 907 Kirkham street, Oakland, in the county of Alameda and State of California, have invented new and useful Improvements in Motor-Vehicles, of which the following is a specification.

The invention has relation to mechanically propelled vehicles whether designed for pleasure or for use as a truck for hauling loads, the purpose being the provision of a vehicle having front and rear axles mounted to turn in a manner similar to the front axle of an ordinary wagon or truck, said axles being adapted to be turned to incline in opposite directions to enable the vehicle to make a turn in a comparatively small space, said vehicle being constructed to enable power being applied to the four wheels whereby the propelling force is distributed, thereby enabling the vehicle to be easily driven over rough and soft roads in either direction.

The invention consists in novel means and connections whereby both the front and rear axles are simultaneously turned in opposite directions to enable the vehicle to be steered quickly when it is required to turn the same.

The invention further consists of novel transmission for applying power to the four wheels for propelling the vehicle either forward or backward, said transmission including friction gearing having such relation as to admit of the speed being varied and gradually changed according to the power or movement required.

A further purpose of the invention is the provision of means whereby the vehicle may be driven forward or backward without reversing the engine or requiring the same to be stopped, the transmission including a ratchet and pawl, the latter being double ended to admit of either end being thrown into operative position according as the vehicle is to be driven forward or backward.

The invention further contemplates a single hand wheel and shaft for starting the engine or operating the steering mechanism, the connecting means between such shaft and steering and starting mechanisms including a clutch, whereby one or the other may be thrown into or out of operation without bringing both into action at the same time.

The invention also consists of the novel connecting means between each of the four wheels and the power driven shaft, whereby the wheels may be positively driven forward or backward or the transmitting mechanism thrown into neutral position, thereby admitting of the engine running without imparting movement to the wheels.

The invention consists of the novel features, details of construction and combination of parts, which hereinafter will be more particularly set forth, illustrated in the accompanying drawings, and subsequently claimed.

Referring to the drawings, forming a part of the specification, Figure 1 is a vertical central longitudinal section of a motor vehicle embodying the invention. Fig. 2 is a top plan view of the running gear or chassis, the bodying being removed. Fig. 3 is a detail view showing more clearly the connecting means between the hand operated shaft and the starting and steering shaft. Fig. 4 is a front view of the parts illustrated in Fig. 3. Fig. 5 is a side view of one of the drive wheels, showing the mechanism associated therewith, the parts being on a larger scale. Fig. 6 is a sectional view on the line $x$—$x$ of Fig. 5.

Corresponding and like parts are referred to in the following description, and indicated in all the views of the drawings, by the same reference characters.

It is to be understood that the style, making or design of the vehicle is unimportant within the scope of the invention and it is unimportant whether the vehicle is constructed to be used for pleasure or as a truck solely for transporting loads.

The numeral 1 designates front and rear axles, which are connected with the running gear and body so as to turn about vertical axes similar to the front axle of an ordinary wagon provided with a fifth wheel. The vehicle wheels are mounted upon the arms or spindles of the axles in the usual way so as to turn freely thereon, each being adapted to have the driving power applied thereto. The wheels are constructed similar to the ordinary vehicle wheel designed for light wagons and carriages and comprises a box 2, hub 3 and spokes 4. A plate 24 is placed against one side of the spokes and an internally toothed wheel 13 is placed against the opposite side of the spokes, the parts 24 and 13 being bolted or otherwise secured to the spokes of the wheel. A brake band 14 is arranged to coöperate with the internally toothed wheel 13. A double ended pawl 12 is arranged to have either one of its ends thrown into engagement with the teeth of the wheel 13, according as the vehicle is to be driven forward or backward. A casting 11 is loose with reference to the axle 1 and wheel and has the double ended pawl 12 connected thereto. A worm wheel 5 is mounted upon a hub portion of the casting 11 and is secured to such casting to turn therewith. The worm wheel 5 meshes with a worm 6 secured to a short shaft 7 arranged at a right angle to the axle. A worm 8 secured to the shaft 7 is in mesh with a worm 9 secured to a shaft 10 arranged parallel with the axle and mounted in bearings provided in a housing 15, which incloses the several gear elements to protect the same from dust and the like. The double ended pawl is acted upon by means of springs 17 and is adapted to be actuated by suitable connecting means 16, whereby the pawls of the four wheels are adapted to be simultaneously moved. Each of the shafts 10 is provided with a friction wheel 20, which is adapted to engage a friction wheel 31 on a longitudinal shaft 33, which is connected with a motor 32 of any type. The shaft 33 comprises several sections or members which are coupled by means of universal joints 34 whereby provision is had for relative movement of the axles due to the movement of the vehicle springs. A coupling 35 connects the sections of the drive shaft and the latter is provided with a clutch 36 of any construction to admit of throwing the parts into gear. It is to be understood that the friction gears 30 and 31 may be thrown into or out of engagement or be relatively moved to attain the required speed.

A shaft 38 extends lengthwise of the vehicle and is provided near opposite ends with worms 27 which engage with teeth 26 provided upon the fifth wheels 25. Rotation of the shaft 38 causes the fifth wheels 25 to move in opposition, as indicated by the dotted lines in Fig. 2, whereby the vehicle is enabled to turn in a comparatively short space. A short shaft 20 is mounted upon the dash or other convenient part of the vehicle body and is connected by means of gearing 39 with the shaft 38. Gearing 41 connects the shaft 20 with a shaft 19, which corresponds to the ordinary steering post, which is provided at its upper end with a hand wheel 21. A shaft 43 is located upon the opposite side of the machine and is adapted to make connection with the engine 32 and is geared at its front end by suitable connections 40 with the shaft 20. A clutch 42 is located in the length of the shaft 20. This enables the steering post or shaft 19 to be thrown into or out of engagement with the shaft 43 or 38. When the engine is to be started the shaft 38 is thrown out of gear and the shaft 43 in gear. After the engine has been started the shaft 43 is thrown out of gear and the shaft 38 in gear so that upon operating the hand wheel 21 the vehicle may be started in the usual manner.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention what is claimed as new, is: —

1. In a vehicle of the character specified, the combination of front and rear axles mounted to turn about vertical axes, a motor, a longitudinal shaft having gear connections with each of the axles, a second longitudinal shaft having connection with the motor, a steering post, and connecting means between the steering post and each longitudinal shaft and including a clutch.

2. In a vehicle of the character specified, the combination of front and rear axles mounted to turn about vertical axes, a motor, a longitudinal shaft having gear connections with each of the axles, a second longitudinal shaft having connection with the motor, a steering post, a shaft, connecting means between the shaft and steering post, and connecting means between the shaft and each longitudinal shaft.

3. In a motor vehicle the combination of the motor, steering mechanism, a steering post, a shaft, connecting means between the steering post and shaft, connecting means between the shaft and the motor and steering mechanism to admit of operation of either by means of the steering post, and a clutch on the shaft for throwing the steering post into or out of operative connection with the engine starting mechanism or the steering mechanism.

4. In a motor vehicle, the combination of the motor, steering mechanism, a steering post, a shaft disposed directly below and in adjacent relation to the steering post, connecting means between the steering post and shaft, connecting means between the shaft and the motor and steering mechanism to admit of operation of either by means of the steering post, and a clutch arranged in the length of the shaft and at points between the points of connection of the shaft with the motor and steering mechanism, for throwing the steering post into or out of operative connection with the engine starting mechanism.

In testimony whereof I affix my signature in presence of two witnesses.

WALLACE A. LEE.

Witnesses:
L. M. GRIESEMER,
H. S. CRAIG.